June 15, 1948.  W. R. CARTER  2,443,300

VOLTAGE REGULATOR

Filed April 30, 1945  2 Sheets-Sheet 1

Inventor
William R. Carter
By Akel C. Benson
Attorney

June 15, 1948. W. R. CARTER 2,443,300
VOLTAGE REGULATOR
Filed April 30, 1945 2 Sheets-Sheet 2

Inventor
William R. Carter
By Akel C. Benson
Attorney

Patented June 15, 1948

2,443,300

UNITED STATES PATENT OFFICE 2,443,300

VOLTAGE REGULATOR

William R. Carter, Minneapolis, Minn., assignor to Electric Machinery Mfg. Company, Minneapolis, Minn.

Application April 30, 1945, Serial No. 591,208

8 Claims. (Cl. 322—28)

1

My invention relates to voltage regulators and has for an object to provide a voltage regulator which will operate indefinitely without attention.

Another object of the invention resides in providing a voltage regulator having no moving parts.

A still further object of the invention resides in providing a voltage regulator in which the voltage to be regulated is amplified and the amplified voltage is used to regulate the generator field current.

Another object of the invention resides in providing a voltage regulator using a resonant circuit for amplifying the voltage.

A feature of the invention resides in energizing the resonant circuit from the voltage to be regulated.

Another object of the invention resides in employing in the resonant circuit an inductive reactance and a capacitive reactance connected in series and in connecting to the resonant circuit a control circuit energized by the voltage across the capacitive reactance.

A still further object of the invention resides in providing a rectifier energized by the current in said resonant circuit and in further providing a regulating circuit energized by said rectifier, said regulating circuit serving to regulate the excitation current through the field winding of the generator.

A feature of the invention resides in connecting the regulating circuit to the exciter field-winding circuit in such a manner that the voltage produced by the rectifier opposes the field-winding voltage produced by the exciter.

Another object of the invention resides in providing the exciter with two field windings, one energized by the exciter armature voltage and the other connected to the regulating circuit.

A still further object of the invention resides in providing a stabilizing transformer having a primary winding energized by the exciter voltage and a secondary winding connected in the regulating circuit.

Other objects of the invention reside in the novel combination and arrangement of parts and in the details of construction hereinafter illustrated and/or described.

In the drawings:

Fig. 3 is a view similar to Fig. 1 of still another form of the invention.

2

In the operation of voltage regulators, difficulty has been encountered with ordinary regulators, due to the wear of moving parts and to the adjustments and replacements necessary to maintain such regulators in operating condition. The present invention overcomes these difficulties by providing a voltage regulator in which there are no moving parts.

Figure 1:
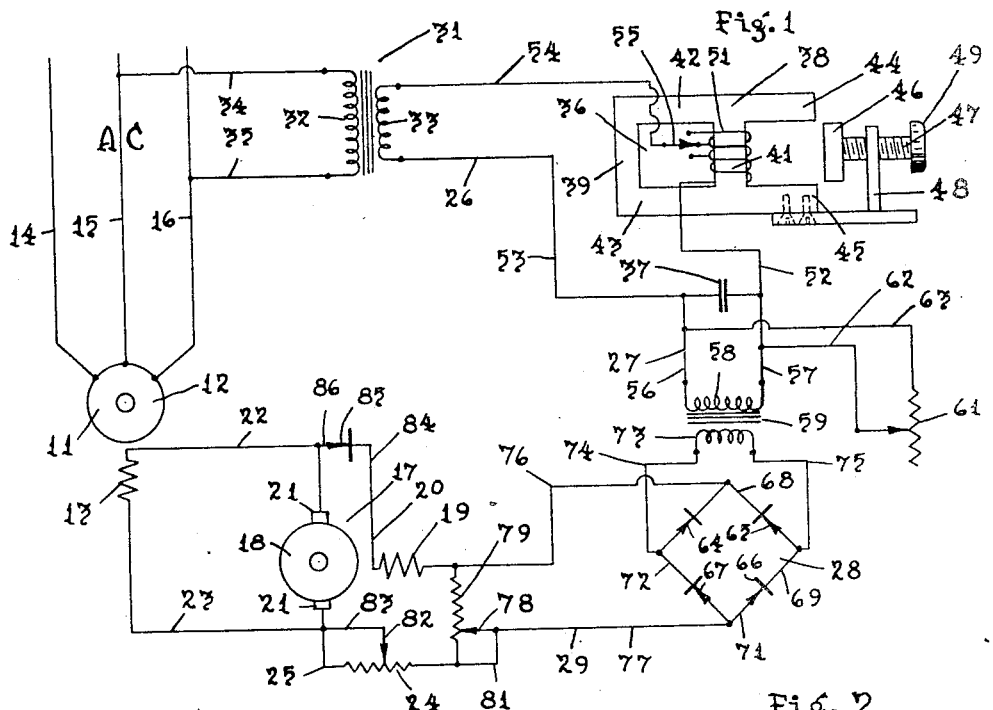
Fig. 1 is a wiring diagram of an embodiment of my invention applied to an alternating-current generator.

For the purpose of illustrating the application of the invention, an alternating-current generator 11 has been illustrated in Fig. 1 which is provided with an armature 12 and a field winding 13. The armature winding 12 is connected to an alternating-current line indicated by the reference characters AC and comprising conductors 14, 15 and 16. The field-winding 13 of generator 11 is energized with direct current derived from an exciter 17. This exciter comprises an armature 18 and a field-winding 19, which is connected in a field-winding circuit 20. Field-winding 13 of the generator 11 is directly connected across the brushes 21 of the armature 18 of exciter 17 by means of conductors 22 and 23. An adjustable resistor 24 is employed which is connected to the conductor 23 by means of a conductor 25 and which is also connected to the circuit containing the field-winding 19 in a manner to be presently more fully described.

The invention includes a voltage-sensitive circuit 26 which is energized from the line AC, which I have termed a resonant circuit and which operates at a near-resonant condition at normal frequency and voltage. This circuit energizes a control circuit 27 which is connected to a rectifier 28. The rectifier 28 energizes a regulating circuit 29 which regulates the voltage across the field-winding 13 of generator 11. These various circuits will now be described in detail.

For energizing the voltage-sensitive circuit 26, a transformer 31 is employed having a primary winding 32 and a secondary winding 33. The primary winding 32 is connected by means of conductors 34 and 35 to any two of the conductors of the line AC. In the particular embodiment of the invention illustrated, the conductors 34 and 35 have been shown as connected to the conductors 15 and 16 of the said line. The resonant circuit 26 contains an inductive reactance 36 and a capacitive reactance 37. The reactance 36 consists of a core 38 having two vertical legs 39 and 41 and two horizontal core sections 42 and 43 connecting the legs 39 and 41. The core 38 further comprises two outwardly projecting core sections 44 and 45 which straddle the leg 41. Cooperating with the core sections 44 and 45 of core 38 is a magnetic shunt 46 which is adapted to vary the inductance of the reactance 36 by varying the reluctance of the magnetic circuit in the core 38 so as to vary the flux passing through the leg 41 of said core. The shunt 46 is mounted on a screw 47 which screws into a support 48 attached to the core section 45. By turning a knob 49 on the said screw, the shunt 46 may be moved toward or away from the core sections 44 and 45 to vary the reluctance of the magnetic circuit.

Encircling the leg 41 of the core 38, is a tapped winding 51, one end of which is connected by means of a conductor 52 with one side of the capacitive reactance 37. The other side of the reactance 37 is connected by means of a conductor 53 with one side of the secondary 33 of transformer 31. The other side of the secondary of this transformer is connected by means of a conductor 54 with a contact arm 55 which coacts with the taps of the winding 51. These conductors and the two reactances constitute the voltage-sensitive circuit 26 heretofore referred to. The two reactances 36 and 37 are connected in series in the circuit 26, so that at the desired frequencies, the said reactances are substantially equal to form a resonant circuit. This characteristic is made use of in the regulation of the voltage of the generator, as will hereinafter be more fully described.

The control circuit 27 consists of two conductors 56 and 57 which are connected to the conductors 53 and 52 and to the primary winding 58 of a transformer 59. This circuit, it will be noted, is connected across the reactance 37 and is energized by the voltage across this reactance. For the purpose of adjusting the value of the voltage across this reactance, an adjustable resistor 61 is employed which is connected by means of two conductors 62 and 63 with the conductors 56 and 57. The control circuit 27 energizes the rectifier 28. This rectifier consists of four half-wave rectifier units 64, 65, 66 and 67 which are connected in the form of a bridge by means of conductors 68, 69, 71 and 72. The secondary winding 73 of the transformer 59 has connected to it two conductors 74 and 75 which, in turn, are connected to the conductors 72 and 69 of the rectifier 28.

The regulating circuit 29 includes two conductors 76 and 77 which are respectively connected to the conductors 68 and 71 of the rectifier 28. The conductor 76 is directly connected to the field winding 19 of the exciter 17, while the conductor 77 is connected to the contact arm 78 of an adjustable resistor 79. The said resistor is connected at one end to the conductor 76 and at its other end to a conductor 81 which, in turn, is connected to the conductor 77 and to one end of the resistor 24. The movable contact arm 82 of resistor 24 is connected by means of a conductor 83 with the conductor 25, previously referred to. The field-winding circuit 20 of exciter 17 includes a conductor 84 which is connected to the field winding 19 and to an electric valve 85 which, in turn, is connected by means of a conductor 86 with the conductor 22. The resistor 24 is the usual field rheostat employed to regulate the field excitation of the exciter 17, while the adjustable resistor 79 is an additional resistor used with the invention and connected in series with the resistor 24 and the field winding 19.

The operation of the invention is as follows: The voltage-sensitive circuit 26 is energized from the line AC by the voltage to be regulated. This voltage is impressed upon the circuit 26 by the transformer 31 and at operating frequency and voltage produces a near-resonant condition in said resonant circuit. An increase or decrease in this voltage above or below normal voltage produces a corresponding amplified increase or decrease of voltage across the capacitive reactance 37, due to the relation between the reactance 36 and the reactance 37. This amplified voltage is impressed upon the rectifier 28 which, in turn, energizes the circuit 29 with direct current. This direct current is impressed upon the resistor 79 which produces a voltage in the field-winding circuit 20. The rectifier units are so arranged that full-wave rectification is procured and so that the voltage impressed upon the resistor 79 opposes the voltage in the field-winding circuit 20 produced by the armature 18 of the exciter 17. It will thus be seen that when the voltage of the generator 11 increases, that the direct current produced in the circuit 29 also increases and at a much greater rate. This voltage opposes the voltage applied to the exciter field-winding 19, thus reducing the magnetic field flux and terminal voltage of the exciter and, in turn, the corresponding voltage across the field-winding 13 of generator 11. In order to produce a condition in which the voltage across the resistance 79 compensates for the increase in line voltage of the generator, coarse adjustments of the value of the reactance 36 may be made by shifting the tap arm 55 to the various taps of the winding 51. Fine adjustments of the value of this reactance may be made by moving the magnetic shunt 46 with reference to the core sections 44 and 45 of the core 38. In addition, the voltage impressed upon the control circuit 27 may be adjusted by means of the adjustable resistor 61 and, lastly, the voltage impressed upon the resistor 79 may be adjusted by the shifting of the contact arm 78 of said resistor.

The electric valve 85 consists of an ordinary rectifier unit of sufficient capacity which is connected in the field winding circuit in such a manner that the current will flow through the exciter field-winding 19 in the proper direction. In the event that rapid and pronounced changes in the voltage of the generator should produce a correspondingly great change in the voltage of the regulating circuit 29, the valve 85 would prevent reversal of current through the exciter field-winding 19 and the resultant reversal of polarity of the exciter.

Figure 2:
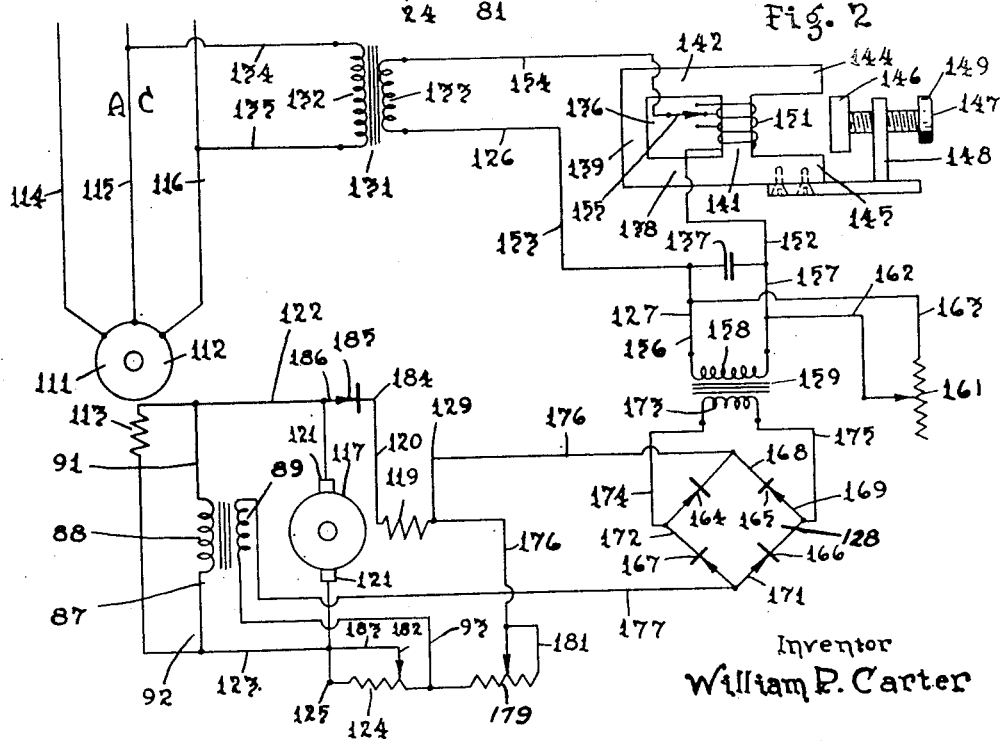
Fig. 2 is a view similar to Fig. 1 of a modification of the invention.
Figure 2:
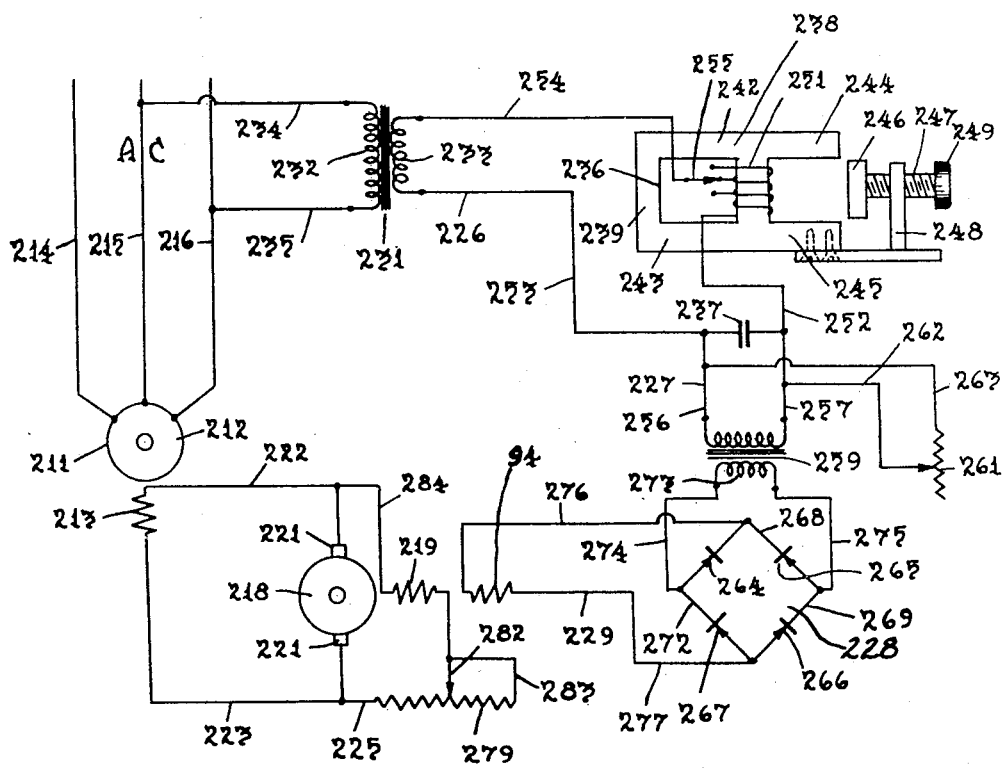

In Fig. 2, I have shown a modification of the invention. Due to the fact that some of the parts of this form of the invention are the same as those shown in Fig. 1, the description of said parts will not be repeated, and the same reference numerals, preceded by the digit "1," will be used to designate the corresponding parts.

In the form of the invention shown in Fig. 2, a stabilizing transformer 87 is employed which has a primary winding 88 and a secondary winding 89. The primary winding 88 of this transformer is connected by means of conductors 91 and 92 across the conductors 122 and 123 of the circuit energizing the field winding 113 of the generator 111. The secondary winding 89 of this transformer is connected in the circuit 129 by means of the conductor 177 and a conductor 193. This secondary winding is thus in series with the rectifier 128 and the resistor 179. The purpose of the transformer 87 is to materially reduce hunting and to cause the voltage produced by the exciter 117 to become normal as quickly as possible after any change in the voltage of the line AC.

Instead of using a resistor connected in series with the field-winding of the exciter and of impressing the rectifier control voltage upon this resistor, a separate field-winding may be employed for the exciter and the voltage impressed on this field-winding. A circuit showing such an arrangement is illustrated in Fig. 3. Inasmuch as most of the parts shown in Fig. 3 are identical with those shown in Fig. 1, the description thereof will not be repeated and the same reference numerals, preceded by the reference character "2" will be used to designate the corresponding parts.

In the form of the invention shown in Fig. 3, the resistor 79 is dispensed with and an additional field-winding 94 is employed in place thereof. This winding is mounted on the cores of the field structure of the exciter adjacent the windings 219, but is connected so that the current flows through the convolutions thereof in the opposite direction as compared to the direction of flow of current in the winding 219. The winding 94 is connected to the conductors 276 and 277 so that the voltage produced by the rectifier 228 is impressed directly upon said winding. The winding 94 is so designed that the flux produced by said winding can rarely, if ever, overpower the flux produced by the main field-winding 219. In this manner, it becomes impossible to reverse polarity of the exciter field in the event of a radical change of the voltage of the generator 211.

The advantages of my invention are manifest. Due to the absence of moving parts, the device will function indefinitely without attention. After the device has once been adjusted, no further readjustment will be required as long as the same performance is desired. Due to the fact that inertia of moving parts does not enter into the operation of the device, the response becomes exceedingly rapid. With my invention, the voltage variations at the generator may be sufficiently amplified so that the resultant direct-current voltage may be directly employed upon the exciter field-winding circuit without the use of relays or electronic amplifiers. The invention may be readily and quickly adjusted in a simple and practical manner to produce any desired performance within the range of the device. Where the stabilizing transformer is employed, normal voltage of the generator is quickly procured so that hunting and the variations of voltage above and below normal are greatly reduced. My invention may be constructed at a nominal expense and can be contained in a small and compact container. My invention operates within close limits so that it becomes unnecessary to utilize a generator having a voltage regulation of low percentage.

Changes in the specific form of my invention, as herein disclosed, may be made within the scope of what is claimed without departing from the spirit of my invention.

Having described my invention, what I claim as new and desire to protect by Letters Patent is:

1. In combination, an exciter for exciting an alternating-current generator of the constant-frequency type, said exciter including two field-windings and an armature, means for energizing one of said field-windings from the exciter armature, a regulator comprising a voltage-sensitive resonant circuit consisting of a single inductive reactance and a single capacitive reactance of substantially the same value as said inductive reactance, said resonant circuit having negligible resistance and being energized by the generator voltage, a control circuit responsive to the voltage across said capacitive reactance, a rectifier energized by the current in said control circuit, a regulating circuit energized by said rectifier, the other of said exciter field-windings being connected in said regulating circuit.

2. A voltage regulator for use with an alternating-current generator having an exciter provided with a field-winding circuit, said regulator comprising a voltage-sensitive circuit consisting of a single inductive reactance and a single capacitive reactance, said voltage-sensitive circuit being energized by the voltage to be regulated, a control circuit responsive to the voltage across said capacitive reactance, a rectifier energized by the current in said control circuit, a regulating circuit energized by said rectifier, said regulating circuit operating to regulate the exciter voltage and a stabilizer transformer having a primary winding and a secondary winding, said primary winding being energized by the voltage produced by said exciter and said secondary winding being connected in said regulating circuit.

3. A voltage regulator for use with an alternating current generator having an exciter provided with a field-winding circuit, said regulator comprising a voltage-sensitive circuit consisting of a single inductive reactance and a single capacitive resistance, said voltage-sensitive circuit being energized by the voltage to be regulated, a control circuit responsive to the voltage across said capacitive reactance, a rectifier energized by the current in said control circuit, a regulating circuit energized by said rectifier, said regulating circuit being connected to the exciter field-winding circuit and in such a manner that the voltage produced by said rectifier opposes the field-winding voltage produced by the exciter and a stabilizer transformer having a primary winding and a secondary winding, said primary winding being energized by the voltage produced by said exciter and said secondary winding being connected in said regulating circuit.

4. A voltage regulator for use with an alternating-current generator of the constant-frequency type having a field-winding circuit, said regulator comprising a voltage-sensitive resonant circuit consisting of a single inductive reactance and a single capacitive reactance of substantially the same value as said inductive reactance connected in series in said resonant circuit, said resonant circuit having negligible resistance and being energized by the voltage to be regulated, a control circuit responsive to the voltage across only said capacitive reactance and means operable by the current in said control circuit for regulating the current in said field-winding circuit.

5. A voltage regulator for use with an alternating-current generator of the constant-frequency type having a field-winding circuit, said regulator comprising a voltage-sensitive resonant circuit including an inductive reactance and a capacitive reactance, said resonant circuit being energized by the voltage to be regulated, a control circuit responsive to the voltage across said capacitive reactance, means for varying the inductance of said inductive reactance and means operable by the current in said control circuit for regulating the current in said field-winding circuit.

6. A voltage regulator for use with an alternating-current generator of the constant-frequency type having a field-winding circuit, said regulator comprising a voltage-sensitive resonant circuit consisting of a single inductive reactance and a single capacitive reactance connected in series in said resonant circuit, said circuit including two conductors across which a voltage is applied which varies in accordance with the voltage to be regulated, the first of said conductors being connected directly to the inductive reactance, and the second of said conductors being connected to the capacitive reactance, said circuit further including a third conductor connecting said inductive reactance to said capacitive reactance, a control circuit connected to said second conductor and to said third conductor and means operable by the current in said control circuit for regulating the current in said field-winding circuit.

7. A voltage regulator for use with an alternating-current generator of the constant-frequency type having a field-winding circuit, said regulator comprising a voltage-sensitive resonant circuit consisting of a single inductive reactance and a single capacitive reactance of substantially the same value as said inductive reactance connected in series in said resonant circuit, said resonant circuit having negligible resistance and being energized by the voltage to be regulated, a transformer connected across said capacitive reactance, a control circuit energized by said transformer and means operable by the current in said control circuit for regulating the current in said field-winding circuit.

8. A voltage regulator for use with an alternating-current generator of the constant-frequency type having a single field-winding circuit, said regulator comprising a voltage-sensitive resonant circuit consisting of a single inductive reactance and a single capacitive reactance of substantially the same value as said inductive reactance connected in series in said resonant circuit, said resonant circuit having negligible resistance and being energized by the voltage to be regulated, a control circuit responsive to the voltage across only said capacitive reactance and means operable by the current in said control circuit for regulating the current in said field-winding circuit.

WILLIAM R. CARTER.

REFERENCES CITED

The following references are of record in the file of this patent:

UNITED STATES PATENTS

| Number | Name | Date |
| --- | --- | --- |
| 2,021,754 | Suits | Nov. 19, 1935 |
| 2,085,596 | Lord | June 29, 1937 |
| 2,134,880 | McDowell et al. | Nov. 1, 1938 |
| 2,158,871 | Jacobsen | May 16, 1939 |
| 2,217,457 | Schmutz | Oct. 8, 1940 |
| 2,344,608 | Haddad | Mar. 21, 1944 |

Certificate of Correction

Patent No. 2,443,300.

June 15, 1948.

WILLIAM R. CARTER

It is hereby certified that error appears in the printed specification of the above numbered patent requiring correction as follows: Column 6, line 32, claim 3, for the word "resistance" read *reactance*; and that the said Letters Patent should be read with this correction therein that the same may conform to the record of the case in the Patent Office.

Signed and sealed this 14th day of September, A. D. 1948.

[SEAL]

THOMAS F. MURPHY,
*Assistant Commissioner of Patents.*